3,663,554
PREPARATION OF β-COLLIDINE
Juerg Albert Walter Gutzwiller, Bloomfield, and Milan Radoje Uskokovic, Upper Montclair, N.J., assignors to Hoffmann-La Roche Inc., Nutley, N.J.
No Drawing. Original application Jan. 22, 1968, Ser. No. 699,334. Divided and this application Mar. 27, 1970, Ser. No. 23,503
Int. Cl. C07d 31/08
U.S. Cl. 260—290 P                                5 Claims

ABSTRACT OF THE DISCLOSURE

The preparation of β-collidine from methyl vinyl ketone and an amine such as, for example, benzylamine, through various intermediates, for example, 3-acetyl-1-benzyl - 1,2,5,6 - tetrahydro-4-methylpyridine, 3-acetyl-1,2,5,6 - tetrahydro - 4 - methylpyridine, 3 - acetyl-4-methylpyridine, 1 - benzyl - 3 - (1-hydroxyethyl)-1,2,5,6-tetrahydro - 4 - methylpyridine, 3-(1-hydroxyethyl)-4-methylpyridine and 1-benzyl-3-ethylene-1,2,3,6-tetrahydro - 4-methylpyridine, is described. β-Collidine, i.e., 3-ethyl-4-methylpyridine, is useful in the synthesis of, for example, dihydroquinidine.

CROSS-REFERENCE TO RELATED APPLICATIONS

This application is a division of U.S. patent application Ser. No. 699,334, filed Jan. 22, 1968, now U.S. Pat. 3,553,221.

BRIEF SUMMARY OF THE INVENTION

The invention relates to a process for preparing β-collidine which comprises the steps of:
(a) Condensing an amine, such as ammonia, benzylamine or a substituted benzylamine with methyl vinyl ketone and dehydrating the reaction product;
(b) Aromatizing the product of step (a) and, when R is other than hydrogen, simultaneously debenzylating the product of step (a) to yield 3-acetyl-4-methylpyridine; and
(c) Reducing the product of step (b) to form β-collidine.

When the amine utilized in step (a) is benzylamine or substituted benzylamine, another aspect of the invention comprises the steps of:
(d) Reducing the product of step (a); and
(e) Simultaneously dehydrating, debenzylating and aromatizing the product of step (d) to form β-collidine.

In still another aspect, the invention comprises the steps of:
(f) Aromatizing the product of step (d);
(g) Debenzylating the product of step (f); and
(h) Reducing the product of step (g) to form β-collidine.

In a further aspect, the invention relates to a process which comprises the steps of:
(i) Dehydrating the product of step (d); and
(j) Simultaneously debenzylating and aromatizing the reaction product of step (i) to form β-collidine.

In still a further aspect, the invention relates to a process which comprises the steps of:
(k) Reducing the product of step (b) with a metal hydride; and
(h) Catalytically hydrogenating the product of step (k) to form β-collidine.

In its final aspect, the invention relates to the hereinafter described intermediates of the Formulas III, VI, VII, VIII and IX.

DETAILED DESCRIPTION OF THE INVENTION

β-Collidine is useful in the preparation of, for example, dihydroquinine and dihydroquinidine [Rabe et al., Chem. Ber. 64, 2487 (1931)], 3,4-diethylpyridine [Taub et al., J. Org. Chem. 30, 3229 (1965)], and diastereoisomeric 6,7-benzomorphans [Fullerton et al., J. Org. Chem., 27, 2554 (1962)].

The preparation of β-collidine according to the invention may be exemplified by the following reaction schemes:

SCHEME I

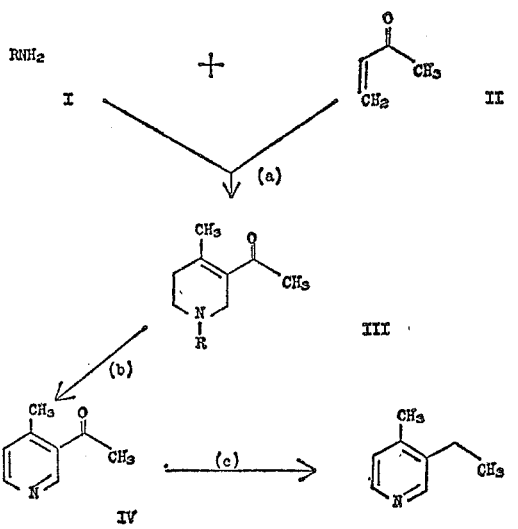

wherein R is selected from the group consisting of hydrogen, benzyl, lower alkyl substituted benzyl, lower alkoxy substituted benzyl and halo substituted benzyl.

As used herein, the term "lower alkyl" denotes a straight or branched chain hydrocarbon group containing 1–7 carbons, e.g., methyl, ethyl, propyl, isopropyl, butyl, tertiary, butyl, and the like; methyl is preferred. The term "lower alkoxy" denotes a lower alkyl ether group in which the lower alkyl moiety is as described above; methoxy is preferred. The term "halogen" denotes chlorine, bromine, fluorine and iodine; chlorine is preferred.

In Scheme I, Reaction (a), the preparation of the compound of Formula III, is carried out by condensing the amine of Formula I and methyl vinyl ketone, preferably in the presence of an inert solvent, such as an alkanol, for example, methanol, ethanol or the like, and subsequently dehydrating the resulting reaction product, for example, with an acid, such as hydrochloric acid, hydrobromic acid, sulfuric acid, para-toluene sulfonic acid, or the like, preferably in a suitable inert solvent, for example, methanol, isopropanol, or the like. Preferably, one molar proportion of the amine is reacted with two molar proportions of the methyl vinyl ketone. Conveniently, the reaction is carried out at a temperature in the range of room temperature and the boiling point of the mixture. However, higher or lower temperatures may be suitably employed. If desired, the crude reaction product may be recovered from the reaction mixture by conventional methods, such as, for example, extraction with ether or other suitable organic solvents. However, the further purification of this crude product is not essential for operation of the process. The crude product as such may be utilized in the subsequent reaction step.

Among the amines of Formula I which may be used in the process of the invention are ammonia, benzylamine, p-methoxybenzylamine, p-chlorobenzylamine, p-methylbenzylamine and the like.

Reaction (b), the conversion of the compound of Formula III, wherein R is benzyl or substituted benzyl, to the compound of Formula IV, is carreid out by simultaneously debenzylating and dehydrogenating the product of reaction (a), wherein R is benzyl or substituted benzyl, utilizing a catalyst such as rhodium on carbon, Raney nickel, palladium on carbon, or the like, in acetic acid alone or with a solvent such as benzene. Conveniently, the reaction is carried out at a temperature in the range of room temperature and the boiling point of the reaction mixture. Following completion of the reaction, the catalyst may be removed by conventional methods, for example, filtration, decantation or the like. If desired, the reaction product may be recovered as previously described in step (a). Again, recovery is not essential and the reaction mixture as such may be subjected to step (c).

The conversion of the compound of Formula III, wherein R is hydrogen, is carried out as above, except that debenzylation is omitted.

Reaction (c), the conversion of the compound of Formula IV, i.e., 3-acetyl-4-methylpyridine, to the compound of Formula V, i.e., β-collidine, is carried out by reducing the product of Reaction (b) with hydrogen under pressure, for example, at 100 to 200 p.s.i., in the presence of a reducing catalyst, such as palladium on carbon, Raney nickel, rhodium on carbon, or the like. Recovery of the β-collidine may be effected employing conventional methods, for example, conversion to the acid addition salt, and crystallization.

SCHEME II

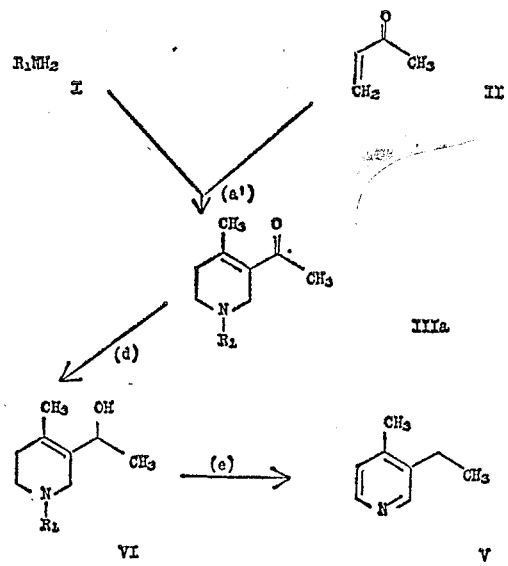

wherein $R_1$ is selected from the group consisting of benzyl, lower alkyl substituted benzyl, lower alkoxy substituted benzyl, and halo substituted benzyl.

In Scheme II, Reaction (a') is carried out under the conditions previously described for Reaction (a).

Reaction (d), the conversion of the compound of Formula IIIa to the compound of Formula VI, is carried out utilizing a reducing agent, such as a metal hydride, for example, sodium borohydride, lithium aluminum hydride, lithium borohydride, lithium aluminum-tri-t-butoxy hydride, diisobutyl aluminum hydride, potassium borohydride, and the like, in an inert organic solvent, for example, sodium borohydride in methanol or isopropanol, diisobutyl aluminum hydride in toluene, lithium aluminum tri-t-butoxy hydride in tetrahydrofuran, ether, diglyme or the like. Advantageously, the reaction is carried out at a temperature in the range of from about 0–100° C., preferably from about 20 to about 75° C. The reaction product may be separated by conventional methods.

Reaction (e), the conversion of the compound of Formula VI to β-collidine is carried out utilizing glacial acetic acid, alone or with a solvent such as benzene, and a catalyst such as rhodium on carbon, Raney nickel, palladium on carbon or the like. Advantageously, the reaction is conducted at reflux temperatures. However, it is possible to utilize temperatures in the range of room temperature to the reflux temperature. Recovery of the β-collidine may be effected as described under Reaction (c).

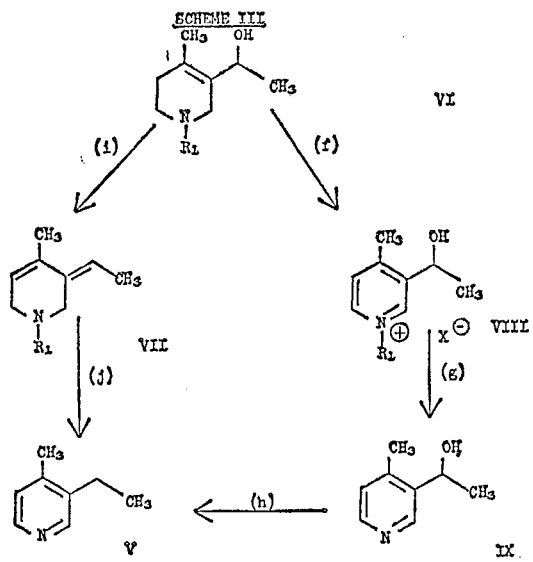

wherein $R_1$ is as previously described, and X is an anion of inorganic acid such as hydrochloric acid, sulfuric acid, nitric acid and the like.

In Scheme III, Reaction (f), the conversion of the compound of Formula VI to the compound of Formula VIII, is carried out utilizing mercuric acetate in an aqueous solution of acetic acid. Advantageously, the reaction may be carried out at a temperature in the range of room temperature to 100° C., preferably at 50–90° C. The product is recovered as a salt of an inorganic acid such as hydrochloric acid, sulfuric acid and the like.

Reaction (g), the conversion of the compound of Formula VIII to the compound of Formula IX, i.e., 3-(1-hydroxyethyl)-4-methylpyridine, is carried out utilizing a catalyst such as, for example, palladium on carbon, rhodium on carbon, Raney nickel or the like, in the presence of an inert solvent, for example, ethanol, propanol, butanol or the like, and hydrogenating at atmospheric pressure.

Reaction (h), the conversion of the compound of Formula IX to β-collidine, is carried out utilizing a catalyst, such as, for example, palladium on carbon, rhodium on carbon, Raney nickel, in the presence of an inert solvent such as ethanol, propanol, butanol or the like and hydrogen under pressure, for example, 100–200 p.s.i. Advantageously, the reaction is carried out at temperatures from 0–100° C., preferably from about 25–75° C.

Reaction (i), the conversion of the compound of Formula VI to the compound of Formula VII, i.e., 1-benzyl-3-ethylene-1,2,3,6-tetrahydro-4-methylpyridine, is carried out utilizing a dehydrating agent, such as an acid, for example, hydrochloric acid, hydrobromic acid, sulfuric acid, paratoluene sulfonic acid or the like. Advantageously, the reaction may be carried out at reflux temperatures. However, temperatures from 0° C. to reflux temperatures may be utilized.

Reaction (j), the conversion of the compound of Formula VII to β-collidine, is carried out utilizing a catalyst such as rhodium on carbon, Raney nickel or palladium on carbon, in a mixture of glacial acetic acid and benzene. Advantageously, the reaction is carried out at a temperature of from about 0° C. to reflux temperatures, preferably at reflux temperatures. Recovery may be effected as described under Reaction (c).

SCHEME IV

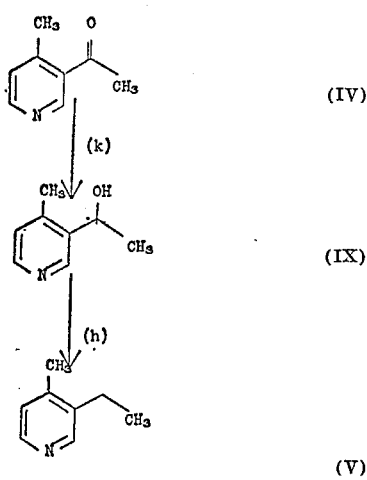

In Scheme IV, Reaction (k), the conversion of the compound of Formula IV to the compound of Formula IX, i.e., 3-(1-hydroxyethyl)-4-methylpyridine, is carried out utilizing a reducing catalyst such as previously described under Reaction (d), in an inert solvent.

Reaction (h) is carried out as previously described.

Conveniently, the various intermediates hereinbefore mentioned, may be reacted in the form of the free base or as the acid addition salt with, for instance, pharmaceutically acceptable acids such as hydrochloric acid, sulfuric acid and the like. The acid addition salts or the corresponding free base, whichever is desired, can be prepared utilizing conventional procedures.

Furthermore, those of the intermediates hereinbefore mentioned which form racemic mixtures can be utilized as such or can be separated into their fractions utilizing conventional procedures.

The following non-limiting examples further illustrate the invention. All temperatures are in degrees centigrade, unless otherwise mentioned.

EXAMPLE 1

Preparation of 3-acetyl-1-benzyl-1,2,5,6-tetrahydro-4-methylpyridine oxalate

To a solution containing 107 g. of benzylamine in 500 ml. of methanol, stirred and cooled on an ice bath, a solution containing 154 g. of freshly distilled methyl vinyl ketone in 500 ml. of methanol was added dropwise. The reaction mixture was allowed to attain room temperature and was stirred overnight. After evaporation to dryness in vacuo, 236.5 g. of oily residue were obtained. The residue was dissolved in 800 ml. of isopropanol saturated with hydrogen chloride gas. The resulting solution was heated at 60° for 1.5 hours, and thereafter evaporated to dryness in vacuo. The 267.5 g. of oily residue obtained were dissolved in 300 ml. of water, made alkaline with 2 N aqueous sodium carbonate (600 ml.), and extracted with five 500 ml. portions of ether. The combined extracts were washed with two 100 ml. portions of water, dried over anhydrous magnesium sulfate and evaporated in vacuo to yield 144 g. of crude oily 3-acetyl-1-benzyl-1,2,5,6-tetrahydro-4-methylpyridine. The crude product was distilled under reduced pressure (0.025 mm.) and three fractions were collected: first fraction distilled at 50–144° and weighed 34.2 g.; second fraction distilled at 144–147° and weighed 123 g.; and third fraction distilled at 143–144° and weighed 9.9 g. The second fraction was dissolved in 200 ml. of methanol and to it were added 48.9 g. of oxalic acid to yield 98 g. of oxalate having an M.P. of 143.8–144.8°.

EXAMPLE 2

Preparation of 1-benzyl-3-(1-hydroxyethyl)-1,2,5,6-tetrahydro-4-methylpyridine

To a solution containing 6.5 g. of 3-acetyl-1-benzyl-1,2,5,6-tetrahydro-4-methylpyridine (made from the oxalate of Example 1) in 50 ml. of isopropanol, 1.074 g. of sodium borohydride were added. The reaction mixture was stirred for one hour at room temperature and then for three and a half hours at 60°. Thereafter, the reaction mixture was neutralized with 2 ml. acetic acid and evaporated to dryness. To the residue were added 75 ml. of water. The resulting suspension was extracted with six 250 ml. portions of ether. The ether extracts were combined, washed with three 50 ml. portions of aqueous 2 N sodium carbonate and once with 50 ml. of water, dried over anhydrous magnesium sulfate and evaporated to dryness to yield 6.23 g. of oily racemic 1-benzyl - 3 - (1-hydroxyethyl)-1,2,5,6-tetrahydro-4-methylpyridine.

EXAMPLE 3

Preparation of 3-acetyl-4-methylpyridine hydrochloride

A solution containing 3.2 g. of 3-acetyl-1-benzyl-1,2,5,6-tetrahydro-4-methylpyridine oxalate in 50 ml. of water was made alkaline with 12 ml. of aqueous 2 N sodium carbonate solution, and then extracted with five 100 ml. portions of ether. The ether extracts were combined, washed with 25 ml. of water, dried over anhydrous magnesium sulfate and evaporated to dryness in vacuo. The 2.64 g. of oily residue obtained were dissolved in 100 ml. of acetic acid benzene (1:1 volume) and 2 g. of 10 percent palladium on carbon were added. The resulting suspension was refluxed 3 hours. Thereafter, the catalyst was removed by filtration, and the filtrate was evaporated to dryness. The residue was dissolved in 50 ml. of isopropanol saturated with hydrogen chloride gas. On evaporation, two crops, 0.834 g. and 0.109 g. of crystalline 3-acetyl-4-methylpyridine hydrochloride were obtained (55 percent yield), which after recrystallizations from isopropanol had an M.P. of 180–182°.

In a manner analogous to Example 1, methyl vinyl ketone is reacted with ammonia in place of benzylamine. The crude product containing 3-acetyl-1,2,5,6-tetrahydro-4-methylpyridine is aromatized using acetic acid and benzene (1:1 volume) and 10 percent palladium on carbon, in a manner analogous to Example 3 to yield 3-acetyl-4-methylpyridine hydrochloride.

EXAMPLE 4

Preparation of β-collidine hydrochloride

To a solution containing 1.7 g. of 3-acetyl-4-methylpyridine hydrochloride in 100 ml. of ethanol were added 1 ml. of conc. hydrochloric acid and 1.5 g. of 10 percent palladium on carbon. The resulting suspension was hydrogenated at 200 p.s.i. pressure and at a temperature of 50–60°. Thereafter, the reaction mixture was filtered to yield 1.6 g. of crystalline β-collidine hydrochloride, which after recrystallization from acetone had a melting point of 158–166°.

EXAMPLE 5

Preparation of racemic N-benzyl-3-(1-hydroxyethyl)-4-methylpyridinium chloride

To a solution containing 2.31 g. of 1-benzyl-3-(1-hydroxyethyl)-1,2,5,6-tetrahydro-4-methylpyridine in 168 ml. of 50 percent aqueous acetic acid, 25.5 g. of mercuric acetate were added, and the reaction mixture was stirred at 75–80° for 17 hours. After cooling to room temperature, the 8.62 g. of mercurous acetate that formed were removed by filtration. The filtrate was saturated with hydrogen sulfide over a period of twenty minutes and the black precipitate obtained was removed by filtration. The resulting filtrate was evaporated to dryness, and the residue that formed was dissolved in 100 ml. of isopropanol saturated with hydrogen chloride. The resulting solution was evaporated to yield 2.38 g. (90.4 percent) of anhydrous N-benzyl-3-(1 - hydroxyethyl)-4-methylpyridinium chloride.

EXAMPLE 6

Preparation of racemic 3-(1-hydroxyethyl)-4-methylpyridine hydrochloride

To a solution containing 2.33 g. of N-benzyl-3-(1-hydroxyethyl)-4-methylpyridinium chloride in 50 ml. of ethanol, 1 ml. of conc. hydrochloric acid and 1.5 g. of 10 percent palladium on carbon were added. The resulting mixture was hydrogenated at atmospheric pressure. (The hydrogen uptake was 0.0103 mole.) Thereafter, the catalyst was removed by filtration, and the filtrate was evaporated to dryness to yield 1.43 g. of crystalline 3-(1-hydroxyethyl)-4-methylpyridine hydrochloride which after recrystallization from acetone had a melting point of 142.5–144°.

EXAMPLE 7

Preparation of racemic 3-(1-hydroxyethyl)-4-methylpyridine hydrochloride

A solution containing 1.71 g. of 3-acetyl-4-methylpyridine hydrochloride in chloroform was shaken with a saturated aqueous solution of potassium carbonate and then evaporated to yield 1 g. of free base. The free base was dissolved in 50 ml. of isopropanol and reduced with 0.378 g. of sodium borohydride at 60° for one hour. The reaction mixture was acidified with 2 ml. of glacial acetic acid and evaporated to dryness. The residue was dissolved in water and its pH was adjusted to 8, with 2 N sodium carbonate. The resulting suspension was extracted with four 80 ml. portions of chloroform. The extracts were combined, washed with 50 ml. of isopropanol saturated with hydrogen chloride and the resulting solution was evaporated to dryness to yield 1.53 g. (88.5 percent) of 3-(1-hydroxyethyl)-4-methylpyridine which after recrystallization from acetone had a melting point of 147–149°.

EXAMPLE 8

Preparation of β-collidine hydrochloride

To a solution containing 1.74 g. of 3-(1-hydroxyethyl)-4-methylpyridine hydrochloride in 100 ml. of ethanol were added 1 ml. of conc. hydrochloric acid and 1.5 g. of 10 percent palladium on carbon. This mixture was then hydrogenated at 200 p.s.i. pressure and 50–60°. The catalyst was removed by filtration and the filtrate evaporated to yield 1.5 g. (95.5 percent) of crystalline β-collidine hydrochloride which after recrystallization from acetone had a melting point of 150–166°.

EXAMPLE 9

Preparation of β-collidine hydrochloride

To a solution containing 23 g. of 1-benzyl-3-(1-hydroxyethyl)-1,2,5,6-tetrahydro-4-methylpyridine in 1-liter of a 1:1 mixture of glacial acetic acid and benzene were added 10 g. of 10 percent palladium on carbon. The reaction mixture was refluxed for 22 hours. The catalyst was separated by filtration, and the filtrate was evaporated. The 21.6 g. of residual dark brown oil were dissolved in 100 ml. of isopropanol staturated with hydrogen chloride and allowed to stand for two days at room temperature. After evaporation, 22.3 g. of dark brown solid residue were recrystallized from acetone to yield 7.6 g. of β-collidine hydrochloride (48.5 percent).

EXAMPLE 10

Preparation of 1-benzyl-3-ethylene-1,2,3,6-tetrahydro-4-methylpyridine hydrochloride A solution containing 1.61 g. of racemic 1-benzyl-3-(1-hydroxyethyl)-1,2,5,6-tetrahydro-4 - methylpyridine in isopropanol saturated with hydrogen chloride gas was refluxed for 3.5 hours. The resulting reaction mixture was evaporated to dryness to yield 1.073 g. of crude 1-benzyl-3-ethylene-1,2,3,6-tetrahydro-4-methylpyridine hydrochloride which after recrystallization from acetone had a melting point of 212–214°.

EXAMPLE 11

Preparation of β-collidine hydrochloride

To a solution containing 2.13 g. (0.01 mole) of 1-benzyl-3-ethylene-1,2,3,6-tetrahydro - 4 - methylpyridine (free base prepared freshly from hydrochloride) in 100 ml. of 1:1 mixture of glacial acetic acid and benzene, 2 g. of 10 percent palladium on carbon were added. After refluxing the reaction mixture for 16 hours, the catalyst was separated by filtration and the filtrate evaporated to dryness to yield 1 g. of oily residue. This oily residue was dissolved in 8 ml. of conc. hydrochloric acid and 80 ml. of methanol, and the resulting solution was evaporated to dryness. The residue which remained was dissolved in acetone, purified with charcoal and cooled and concentrated to yield 0.33 g. of crystalline β-collidine hydrochloride.

What is claimed is:

1. A process for preparing β-collidine which comprises the steps of:
   (A) condensing an amine of the formula

RNH₂ wherein R is selected from the group consisting of hydrogen, benzyl, lower alkyl substituted benzyl, lower alkoxy substituted benzyl, and halo substituted benzyl, with methyl vinyl ketone in the presence of an inert solvent and treating the reaction product with a dehydrating agent selected from the group consisting of hydrochloric acid, hydrobromic acid, sulfuric acid and paratoluene sulfonic acid;
   (B) producing 3-acetyl-4-methylpyridine by the step which consists of treating the product of step (A) with a dehydrogenating, debenzylating agent selected from the group consisting of rhodium on carbon, Raney nickel and palladium on carbon in the presence of acetic acid alone or in combination with benzene to yield 3-acetyl-4-methylpyridine; and
   (C) treating the reaction product of step (B) with hydrogen under pressure in the presence of a reducing catalyst selected from the group consisting of rhodium on carbon, Raney nickel and palladium on carbon to yield β-collidine.

2. A process according to claim 1 wherein the aromatizing agent and the debenzylating agent of step (B) is palladium on carbon in an acetic acid/benzene mixture.

3. A process according to claim 2 wherein the reducing catalyst of step (C) is palladium on carbon.

4. A process according to claim 3, wherein R is benzyl.

5. A process according to claim 4, wherein one molar proportion of amine is condensed with two molar proportions of methyl vinyl ketone.

References Cited

UNITED STATES PATENTS

| | | | |
|---|---|---|---|
| 3,080,372 | 3/1963 | Janssen et al. | 260—294.7 |
| 2,765,311 | 10/1956 | Horrobin et al. | 260—290 |
| 2,765,310 | 10/1956 | Horrobin et al. | 260—290 |

OTHER REFERENCES

Murata et al., J. Chem. Soc. Japan, Industrial Chem. Sec., vol. 58, pp. 387–88 (1955).

HENRY. R. JILES, Primary Examiner

H. I. MORTAZ, Assistant Examiner

U.S. Cl. X.R.

260—290 H, 297 R